Jan. 30, 1934.  L. Y. SPEAR  1,945,334
INJECTION ENGINE
Filed March 25, 1932
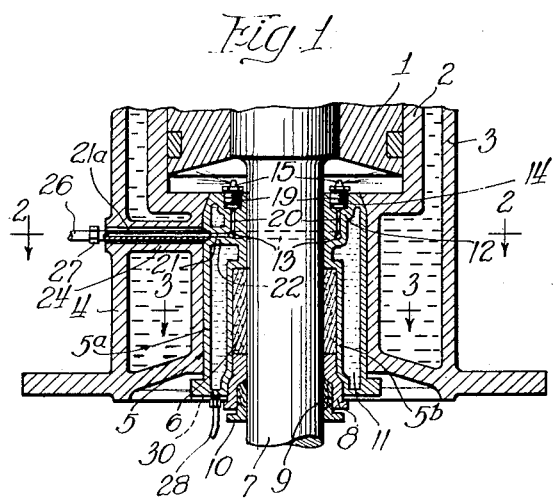
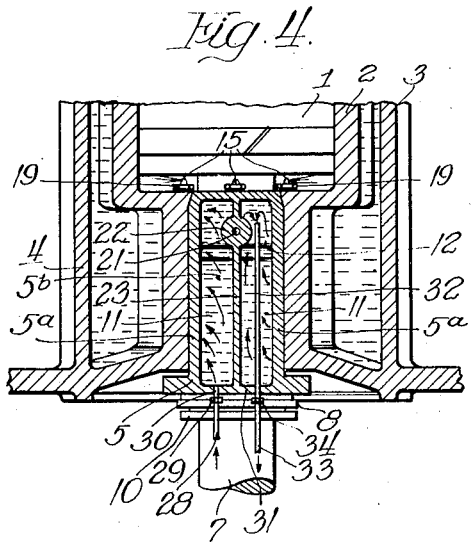
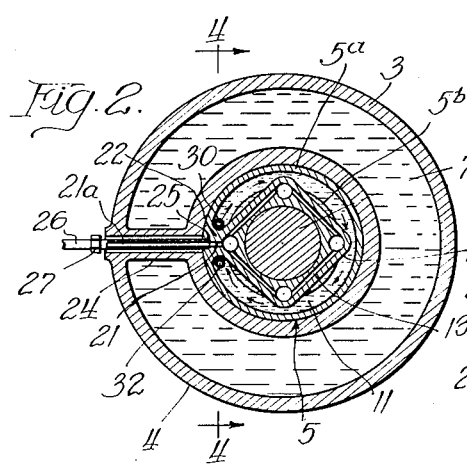
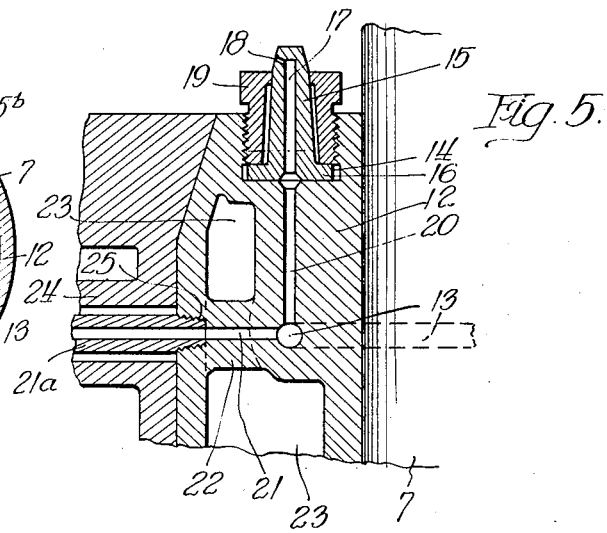
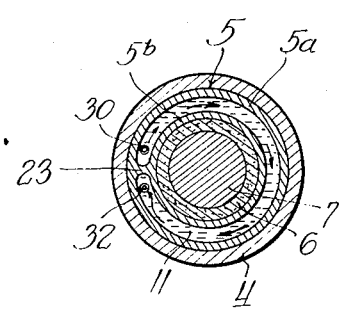
Inventor:
Lawrence Y. Spear
By Brown, Jackson, Boettcher & Dienner,
Attys Patented Jan. 30, 1934

1,945,334

UNITED STATES PATENT OFFICE 1,945,334

INJECTION ENGINE

Lawrence Y. Spear, New London, Conn., assignor to Electric Boat Company, Groton, Conn., a corporation of New Jersey Application March 25, 1932. Serial No. 601,083

7 Claims. (Cl. 123—32)

This invention relates to internal combustion engines, and has to do more particularly with double acting injection engines of the Diesel type.

In double acting injection engines of the type referred to, difficulties are encountered in connection with the means for injecting fuel at the inner or lower end of the cylinder, due to the fact that the lower cylinder head has to accommodate the piston rod. It is known to provide cannons connecting the inner wall and the outer wall of the cylinder structure, at the lower end thereof, suitable injection nozzles being mounted in these cannons. It is also known to provide the lower head of the cylinder with passages extending therethrough, more or less axially thereof, these passages accommodating injection nozzles. Both of these constructions are objectionable as providing rather complicated castings of considerable mass which, when subjected to heat stresses incident to operation of the engine, expand and contract unequally with the result that the metal frequently fractures, particularly at the passages extending therethrough.

In the patent to Lawrence Y. Spear, No. 1,551,706, issued September 1, 1925, there is disclosed an engine in which the gland of a stuffing box structure is provided with fuel passages communicating with injection nozzles disposed to discharge into the lower end of the cylinder. The structure disclosed by this patent is a decided improvement over the prior art above referred to in that the fuel passages are disposed in the stuffing box gland rather than in the engine head, thus reducing likelihood of fracture of the head due to complicated heat stresses. My invention is in the nature of an improvement over the structure disclosed in the above identified patent to Lawrence Y. Spear.

One of the main objects of my invention is to provide a simplified structure for injecting fuel at the lower end of the cylinder and in which the length and the volume of the fuel spaces or passages in the stuffing box casing are materially reduced relative to the structure of the above identified Spear patent. A further object of my invention is to provide a structure of the character stated in which the gland casing is so constructed as to form a comparatively small mass of metal while providing means for circulating a cooling liquid within the casing and associated parts for preventing overheating thereof. Further objects and advantages of my invention will appear from the detailed description.

In the drawing:—

Figure 1 is a central vertical sectional view through the lower portion of a cylinder and associated parts of an injection engine constructed in accordance with my invention, parts being shown in elevation;

Figure 2 is a section taken substantially on line 2—2 of Figure 1;

Figure 3 is a section taken substantially on line 3—3 of Figure 1;

Figure 4 is a section taken substantially on line 4—4 of Figure 2;

Figure 5 is a detail sectional view, on an enlarged scale, through a portion of the engine head and the stuffing box casing and associated parts, the piston rod being shown fragmentarily and in elevation.

I have shown my invention, by way of example, as applied to a double acting injection engine of the Diesel type, though I do not limit it to this particular use, since it may be used for other purposes and with other types of engines. The engine comprises a piston 1 operating in a cylinder 2, about which extends a shell 3 enclosing a space about the cylinder which is thus water-jacketed in a known manner. At the lower end of the cylinder a head 4 is provided, this head being shown as cast integrally with the cylinder structure, though, if desired, it may be formed separately therefrom and secured to the cylinder structure in a known manner. A stuffing box casing 5 is mounted in cylinder head 4 and receives packing material 6 of suitable type which is compressed about piston rod 7, which rod is suitably connected to piston 1 and operates through casing 5, by means of a packing gland 8. Gland 8 is suitably recessed to receive packing material 9 which is compressed about the piston by an inner gland 10 mounted in gland 8. The casing 5, together with the packing materials and the glands, constitutes a stuffing box structure through which the piston rod operates.

Casing 5 comprises an outer wall 5a and an inner wall 5b, these walls being spaced apart and defining a space 11 which, if desired, may be utilized to circulate a cooling liquid through the casing 5. At its upper end casing 5 is provided with a thickened portion 12 in which is formed a fuel passage 13 which is spaced from and extends about the piston rod 7. Casing 5 is suitably bored and threaded from its upper end to provide a plurality of recesses 14 which receive spray or injection nozzles 15, each of which is provided at its lower end with an outer flange 16 which seats flat upon the wall at the lower end of recess 14. Nozzle 15 is provided with a fuel receiving bore 17 extending from its lower end, and with an injection opening 18 extending from the upper end of bore 17 and disposed to direct the injected fuel into the lower end of cylinder 2 and toward the hot cylinder wall. Nozzle 15 is secured in position by a clamp nut 19 which screws into recess 14 and bears upon flange 16, thus holding the nozzle in position with bore 17 thereof in register with the upper end of a fuel passage 20 which extends upwardly from the fuel supply passage 13. A fuel supply duct 21 extends from passage 13 through an enlargement 22 of a web 23 which connects walls 5a and 5b at one side of casing 5, this web extending from top to bottom of the casing. Duct 21 is disposed in the plane of pasage 13 and communicates, at its outer end, with a tube 23 extending through a sleeve 24 formed integrally with head 4 and disposed radially thereof, the inner end of this tube being tapered and screw threaded and screwing into a corresponding recess in enlargement 22, as at 25. A fuel supply tube 26 is suitably connected to the outer end of tube 23, as by means of a coupling 27 of known type. This supply tube 26 leads from a fuel pump by means of which liquid fuel, such as fuel oil, is supplied to passage 13, and thence to the injection nozzles, under pressure and in measured quantity.

By having the casing 5 of hollow construction, the mass of this casing is materially reduced, which is advantageous as eliminating stress such as would be produced by a solid mass of metal of the size of casing 5, if such mass were subjected to the heat incident to the operation of the engine. It will also be noted that the fuel supply passage 13 is disposed adjacent the upper end of casing 5, and the passages 20 are quite short, so that the volume of fuel containing spaces in the casting 5 is small and all of the passages formed in the enlargement 12 of the casing are quite short. This arrangement and relation between the fuel passages is advantageous as reducing likelihood of fracture of casing 5 when subjected to heat stresses, this liability of fracture being greater if comparatively long passages are employed extending through a solid mass of metal.

A further advantage of having the casing 5 of hollow construction is that a cooling liquid can be circulated through this casing, as above indicated, for cooling the casing and associated parts. Ordinarily, water is circulated through the casing 5 for cooling purposes, though any other suitable or preferred liquid or fluid may be employed for this purpose. A water inlet tube 28, which may be connected to any suitable source for supplying water under pressure to the tube, is connected in a suitable manner, as by means of a coupling 29, to a nipple 30, which is secured in and opens through the lower wall 31 of casing 5. It will be noted that nipple 30 is disposed adjacent and at one side of web 23. An outlet tube 32 is suitably secured through bottom wall 31 of casing 5 adjacent and at the other side of web 23, this tube extending upwardly to within a short distance of the upper end of space 11. A water outlet tube 33 is suitably connected to the lower end of tube 32, as by means of a coupling 34. Tube 33 may lead to a suitable cooling device or tank from which the water is taken and is delivered under pressure to the tube 28. The circulation of the cooling liquid through casing 5 is advantageous in that it cools the casing as well as the piston rod bearing in the stuffing box structure, while also cooling the fuel in the passages of the head and the stuffing box structure sufficiently to avoid objectionable heating of the fuel. This cooling of the stuffing box structure and associated parts contributes materially to the elimination of objectionable heat stresses and is preferably employed where objectionable heating of the stuffing box structure and adjacent portions of the cylinder head would otherwise be apt to occur.

The volume of fuel in the passages 13 and 20 is quite small, which is advantageous as reducing the total possible compressibility of the fuel being injected, and contributes to better injection. A further advantage of this small volume of fuel in the passages is that the fuel remains in these passages for less time than would be the case were the passages of greater volume. Also, this small volume of fuel is readily cooled by the cooling liquid circulated through the stuffing box casing. The fuel passages and the nozzles are disposed adjacent parts which are subjected to the heating effect of the hot gases in the cylinder. If the fuel within the passages and associated parts were heated to an appreciably high temperature formation of carbon, causing interference with proper injection of the fuel, would result. By having the volume of fuel in the passages small, and cooling the walls of these passages and adjacent parts, I maintain the fuel and the nozzles at a sufficiently low temperature to avoid formation of carbon in either the passages or the nozzles, facilitating accurate injection of the fuel.

What I claim is:—

1. In combination in an injection engine, a cylinder, a head at one end of the cylinder, a stuffing box structure mounted in said head and comprising a hollow casing provided at its inner portion with fuel passages opening through its inner end, a piston operating in the cylinder, a piston rod connected to the piston and operating through the stuffing box structure, means for supplying fuel to said passages, and injection nozzles communicating with the fuel supply passages and discharging into the cylinder.

2. In combination in an injection engine, a cylinder, a head at one end of the cylinder, a stuffing box structure mounted in said head and comprising a hollow casing provided with fuel supply passages opening through its inner end, a piston operating in the cylinder, a piston rod connected to the piston and operating through the stuffing box structure, means for supplying fuel to said passages, and injection nozzles communicating with the fuel supply passages and discharging into the cylinder.

3. In combination in an injection engine, a cylinder, a head at one end of the cylinder, a stuffing box structure mounted in said head and comprising a hollow casing provided with a thickened portion at its inner end, a piston operating in the cylinder, a piston rod connected to the piston and operating through the stuffing box structure, said thickened portion being provided with a passage extending about the piston rod and with a duct extending from the passage radially of the thickened portion, a fuel supply conduit extending through the head radially thereof and opening into said duct, and injection nozzles communicating with said passage and discharging into the cylinder.

4. In combination in an injection engine, a cylinder, a head at one end of the cylinder, a stuffing box structure mounted in said head and comprising a casing having an inner wall and an outer wall enclosing a space for circulation of a cooling liquid, said structure being provided adjacent its inner end with a fuel passage, means for supplying fuel to said passage, injection nozzles communicating with the fuel passage and discharging into the cylinder, means for circulating a cooling liquid through said space, a piston operating in the cylinder, and a piston rod connected to the piston and operating through the stuffing box structure.

5. In combination in an injection engine, a cylinder, a head at one end of the cylinder, a stuffing box structure mounted in said head and comprising a casing having an inner wall and an outer wall enclosing a space for circulation of a cooling liquid, a web connecting said walls and extending from top to bottom of said space, the web having a thickened portion, said structure being provided with a fuel passage and with a fuel duct extending from said passage through the thickened portion of the web, a fuel supply conduit extending through the head radially thereof and opening into said duct, injection nozzles communicating with the fuel passage and discharging into the cylinder, means for admitting a cooling liquid to said space at one side of said web and for discharging the liquid at the other side of the web, a piston operating in the cylinder, and a piston rod connected to the piston and operating through the stuffing box structure.

6. In combination in an injection engine, a cylinder, a head at one end of the cylinder, a stuffing box structure mounted in the head, a piston operating in the cylinder, a piston rod connected to the piston and operating through said structure, the stuffing box structure comprising a casing having an inner wall and an outer wall defining a space for circulation of a cooling liquid, a web connecting said walls and extending from top to bottom of said space, said structure being provided adjacent its inner end with a fuel passage extending about the piston and with a duct extending from said passage through the web, a fuel supply conduit extending through the head radially thereof and opening into said duct, injection nozzles communicating with the fuel passage and discharging into the cylinder, and means for admitting a cooling liquid to said space at one side of the web and for discharging the liquid at the other side of the web.

7. In combination in an injection engine, a cylinder, a head at one end of the cylinder, a stuffing box structure mounted in said head and provided adjacent its inner end with a fuel passage, means for supplying fuel to said passage, injection nozzles communicating with the fuel passage and discharging into the cylinder, means for circulating a cooling liquid in contact with said structure, a piston operating in the cylinder, and a piston rod connected to the piston and operating through the stuffing box structure.

LAWRENCE Y. SPEAR.